United States Patent
Glahn et al.

(10) Patent No.: US 10,774,684 B2
(45) Date of Patent: Sep. 15, 2020

(54) GAS TURBINE ENGINE SEAL ASSEMBLIES

(71) Applicant: UNITED TECHNOLOGIES CORPORATION, Farmington, CT (US)

(72) Inventors: Jorn Axel Glahn, Manchester, CT (US); Denman H. James, West Hartford, CT (US); Anthony Sr. Demitraszek, Coventry, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 56 days.

(21) Appl. No.: 16/169,965

(22) Filed: Oct. 24, 2018

(65) Prior Publication Data
US 2020/0131935 A1 Apr. 30, 2020

(51) Int. Cl.
*F01D 25/18* (2006.01)
*F01D 25/16* (2006.01)
(Continued)

(52) U.S. Cl.
CPC ............ *F01D 25/183* (2013.01); *F01D 25/16* (2013.01); *F16J 15/30* (2013.01); *F02C 7/06* (2013.01);
(Continued)

(58) Field of Classification Search
CPC .......... F01D 25/16; F01D 25/183; F02C 7/06; F02C 7/28; F16J 15/30; F05D 2220/32; F05D 2240/55; F05D 2260/98
See application file for complete search history.

(56) References Cited

U.S. PATENT DOCUMENTS 2,857,182 A * 10/1958 Bain ........................ F16J 15/38
                                                              277/401
4,088,329 A    5/1978 Junker
(Continued)

FOREIGN PATENT DOCUMENTS

EP        338511 A2    10/1989
EP       2944774 A1    11/2015
(Continued)

OTHER PUBLICATIONS

European Search Report for European Application No. 19204956.7 dated Mar. 17, 2020.

*Primary Examiner* — Igor Kershteyn
(74) *Attorney, Agent, or Firm* — Carlson, Gaskey & Olds, P.C.

(57) ABSTRACT

A gas turbine engine according to an example of the present disclosure includes a shaft rotatable about an axis, a bearing disposed about the shaft and within a bearing compartment, and a seal assembly positioned to seal the bearing compartment. The seal assembly includes a fixed seal and a seal runner rotatable with the shaft. The first axial face and a second axial face axially opposite the first axial face with respect to the axis. The first axial face includes a first surface rotatable against the seal, and the second axial face includes a trough portion. A second surface is angled relative to a radial baseline plane defined perpendicular to the axis, and a dam between the trough portion and the second surface. An oil source is positioned to provide oil into the trough portion.

18 Claims, 3 Drawing Sheets

(51) Int. Cl.
 *F16J 15/30* (2006.01)
 *F02C 7/06* (2006.01)
 *F02C 7/28* (2006.01)
(52) U.S. Cl.
 CPC ............ *F02C 7/28* (2013.01); *F05D 2240/55* (2013.01); *F05D 2260/98* (2013.01)

(56) References Cited

U.S. PATENT DOCUMENTS

| 4,645,415 | A | * | 2/1987 | Hovan | F01D 25/125 |
|---|---|---|---|---|---|
| | | | | | 415/115 |
| 4,928,978 | A | * | 5/1990 | Shaffer | F01D 25/183 |
| | | | | | 277/401 |
| 5,626,347 | A | * | 5/1997 | Ullah | F01D 11/003 |
| | | | | | 277/399 |
| 7,287,384 | B2 | * | 10/2007 | Fish | F01D 11/04 |
| | | | | | 415/111 |
| 8,091,898 | B2 | | 1/2012 | Garrison | |
| 2013/0192239 | A1 | * | 8/2013 | Glahn | F01D 25/18 |
| | | | | | 60/772 |
| 2014/0119887 | A1 | * | 5/2014 | Lyle | F01D 11/005 |
| | | | | | 415/110 |
| 2014/0150449 | A1 | * | 6/2014 | Watson | F01D 5/026 |
| | | | | | 60/785 |
| 2016/0238137 | A1 | * | 8/2016 | Clark | F01D 25/162 |
| 2018/0087404 | A1 | | 3/2018 | Lighty | |
| 2018/0306061 | A1 | * | 10/2018 | Husband | F01D 25/164 |

FOREIGN PATENT DOCUMENTS

| EP | 3385511 | A2 | 10/2018 |
|---|---|---|---|
| WO | 2014138617 | A1 | 9/2014 |

\* cited by examiner

GAS TURBINE ENGINE SEAL ASSEMBLIES

BACKGROUND

This disclosure relates to gas turbine engines, and more particularly to seals for gas turbine engines.

Gas turbine engines typically include a compressor section and a turbine section. The air is compressed in the compressor section. From the compressor section the air is introduced into a combustor section where it is mixed with fuel and ignited in a combustor. Products of this combustion pass downstream over a turbine section to extract energy for driving the compressor section. Gas turbine engines can be utilized to provide propulsion and/or auxiliary power to an aircraft and components thereof.

Various seals may be utilized near the rotating shaft of the engine, such as to contain oil within oil fed areas of the engine. In some examples, existing seal runners for contacting face seals might include multiple cooling holes that are oil fed to extract heat from the seal runners. Some designs may include 30-50 cooling holes.

SUMMARY

A gas turbine engine according to an example of the present disclosure includes a shaft rotatable about an axis, a bearing disposed about the shaft and within a bearing compartment, and a seal assembly positioned to seal the bearing compartment. The seal assembly includes a fixed seal and a seal runner rotatable with the shaft. The seal runner includes a first axial face and a second axial face axially opposite the first axial face with respect to the axis. The first axial face includes a first surface rotatable against the seal. The second axial face includes a trough portion, a second surface angled relative to a radial baseline plane defined perpendicular to the axis, and a dam between the trough portion and the second surface. An oil source is positioned to provide oil into the trough portion.

In a further embodiment according to any of the foregoing embodiments, the fixed seal is a carbon face seal, and the seal runner is metallic.

In a further embodiment according to any of the foregoing embodiments, the second surface is angled between 0 and 45 degrees from the radial baseline.

In a further embodiment according to any of the foregoing embodiments, the second surface extends axially away from the trough portion as it extends radially outward.

In a further embodiment according to any of the foregoing embodiments, the dam is formed by a convex surface including a radially innermost point that is radially inward of a radially outer surface of the trough portion.

In a further embodiment according to any of the foregoing embodiments, the trough portion is radially inward of at least a portion of the angled surface.

In a further embodiment according to any of the foregoing embodiments, a nozzle assembly is disposed in the bearing compartment in communication with the oil source, and the nozzle assembly is positioned to direct oil into the trough portion.

In a further embodiment according to any of the foregoing embodiments, a second nozzle assembly is disposed in the bearing compartment, and the second nozzle assembly is positioned to direct oil toward the bearing.

In a further embodiment according to any of the foregoing embodiments, the seal runner includes a base portion fixed to the shaft. The trough portion, angled surface, and dam are radially outward of the base portion.

In a further embodiment according to any of the foregoing embodiments, the seal runner includes a metallic annular body which has a base portion, a radially outer portion, and a middle portion that connects the base portion and the radially outer portion. The first surface and the second surface are provided by the radially outer portion.

A gas turbine engine according to an example of the present disclosure includes a low pressure compressor, a high pressure compressor, a combustor in fluid communication with the lox pressure compressor and high pressure compressor, a low pressure turbine that drives the low pressure compressor, a high pressure turbine that drives the high pressure compressor through a shaft rotatable about an axis, and a fan driven by the low pressure turbine. A bearing is disposed about the shaft and within a bearing compartment between the high pressure compressor and the low pressure compressor. The high pressure compressor includes an upstream-most stage of airfoils, and the bearing is disposed axially forward of the upstream-most stage relative to the flow of working fluid through the engine. A seal assembly is positioned to seal the bearing compartment. The seal assembly includes a fixed seal and a seal runner rotatable with the shaft. The seal runner has a first axial face and a second axial face axially opposite the first axial face with respect to the axis. The first axial face includes a first surface rotatable against the seal, and the second axial face includes a trough portion, a second surface angled relative to a radial baseline plane defined perpendicular to the axis, and a dam between the trough portion and the second surface. An oil source is positioned to provide oil into the trough portion.

In a further embodiment according to any of the foregoing embodiments, the fixed seal is a face seal.

In a further embodiment according to any of the foregoing embodiments, the seal assembly is axially forward of the bearing.

In a further embodiment according to any of the foregoing embodiments, the seal is axially forward of the seal runner.

In a further embodiment according to any of the foregoing embodiments, the bearing is a thrust bearing.

In a further embodiment according to any of the foregoing embodiments, the fixed seal is a carbon face seal, and the seal runner is metallic.

In a further embodiment according to any of the foregoing embodiments, a plurality of nozzle assemblies are disposed axially between the seal assembly and the bearing.

In a further embodiment according to any of the foregoing embodiments, the dam is formed by a convex surface, and the convex surface includes a radially innermost point that is radially inward of a radially outer surface of the trough portion.

In a further embodiment according to any of the foregoing embodiments, the second surface is angled between 0 and 45 degrees from the radial baseline.

In a further embodiment according to any of the foregoing embodiments, the fixed seal is a carbon face seal, and the seal runner is metallic.

DETAILED DESCRIPTION

Figure 1:
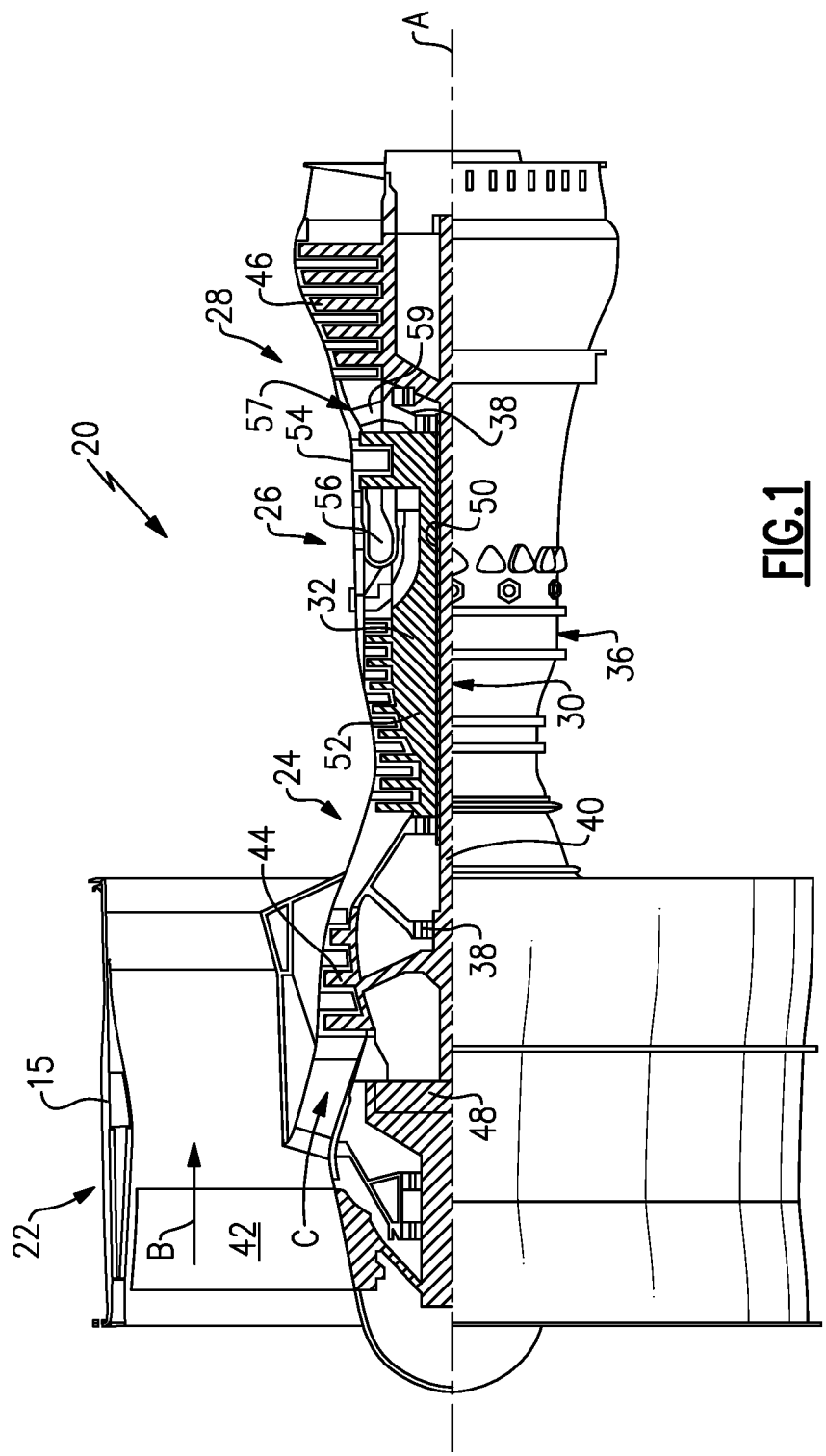
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

Figure 2:
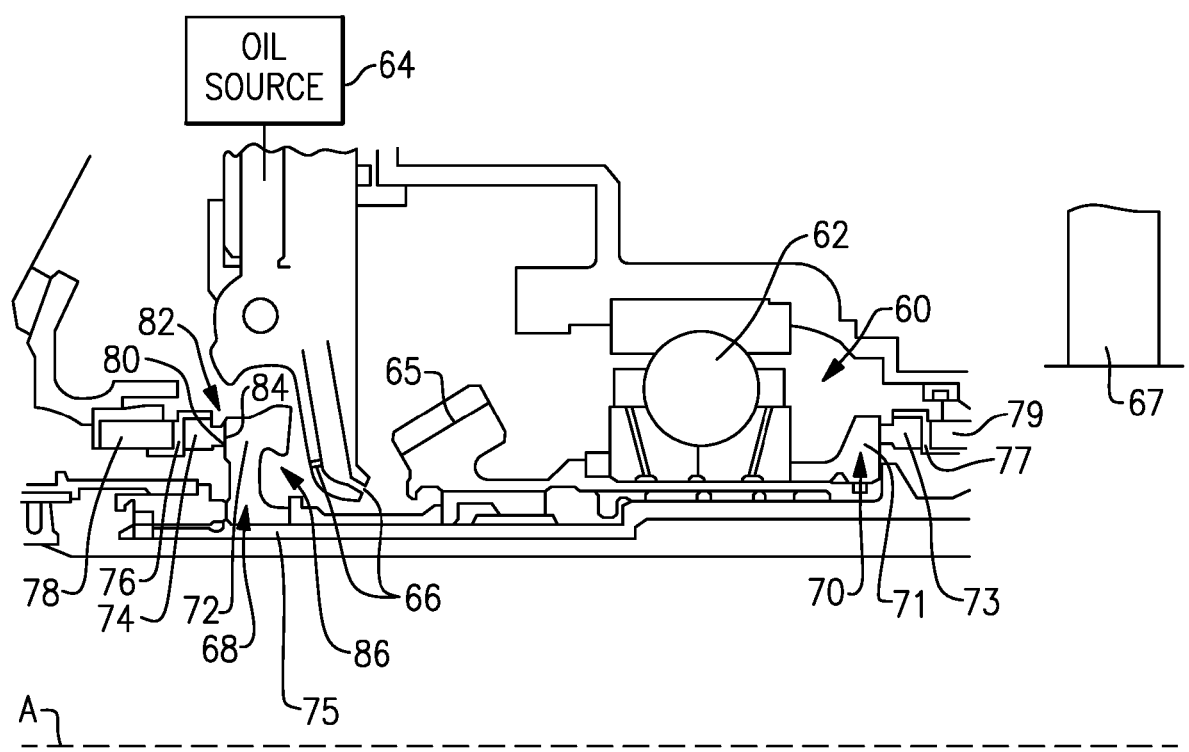
FIG. 2 illustrates a cross section of an example bearing compartment.

FIG. 2 illustrates a bearing compartment 60 for housing a bearing 62 in a gas turbine engine, such as gas turbine engine 20. With reference to FIG. 1, the example bearing compartment 60 is located between the low pressure compressor 44 and the high pressure compressor 52 of the gas turbine engine 20, but one of ordinary skill in the art having the benefit of this disclosure would recognize that other locations could benefit from this disclosure, including the various bearing systems 38 shown in FIG. 1 and described above in some examples.

The bearing 62 in the illustrated example is a high rotor thrust bearing, which is a rotary bearing designed to support an axial load, but other bearing types may be utilized. The example bearing 62 is designed to support axial loads from axially adjacent components to the bearing 62, while allowing rotation of a shaft 75 relative to the engine static structure 36 (see FIG. 1). The example bearing 62 fixes the location of the rotor of the high pressure compressor 52 relative to the engine static structure 36 (see FIG. 1). The example bearing 62 is located at a forward end of the high pressure compressor 52, i.e., at an upstream end of the high pressure compressor 52 relative to the flow of working fluid through the engine 20. The example bearing compartment 60 and bearing 62 are forward of an upstream-most airfoil stage 67 (shown schematically) of the high pressure compressor 52. The example bearing 62 is located aft of a bevel gear 65, which is within the bearing compartment 60 and is configured for transmission of shaft power to an accessory gearbox (not shown).

As shown schematically, an oil source 64 is configured to supply oil through nozzle assemblies 66 to the bearing compartment 60. The oil can be used for lubricating the bearing 62 and cooling various components within the bearing compartment 60. The bearing compartment 60 is sealed from surrounding areas of the gas turbine engine 20 to contain the oil within the bearing compartment 60. Example seals for sealing the bearing compartment 66 include a front seal assembly 68 and a rear seal assembly 70. The front seal assembly 68 includes a seal runner 72 fixed to and rotatable with the shaft 75 about the axis A. The seal runner 72 abuts a seal 74, which is fixed against rotation, and may be held in place by a seal carrier 76 and spring 78 in some examples. The rear seal assembly 70 similarly includes a seal runner 71, a seal 73, a seal carrier 77, and a spring 79. In some examples, the seals 73, 74 are carbon face seals. In some examples, the seals 73, 74 are fully annular. In the example shown, the front seal assembly 68 is forward of the bearing 62, i.e., upstream of the bearing 62 relative to the flow of working fluid through the engine, and the rear seal assembly 70 is aft of the bearing 62, i.e., downstream of the bearing 62 relative to the flow of working fluid through the engine. Although the disclosed examples described below relate to the front seal assembly 68, other seal assemblies, including the rear seal assembly 70, may benefit from this disclosure.

With the seal runner 72 being rotatable and the seal 74 being fixed, a surface 80 at a first axial face 82 of the seal runner 72 rotates against the surface 84 of the fixed seal 74 and generates heat. One of the nozzle assemblies 66 is configured to direct oil from the oil source 64 toward a second axial face 86 of the seal runner 72 opposite the first axial face 82 to cool the seal runner 72. A second nozzle assembly 66 may be configured to direct oil from the oil source 64 toward the bearing 62, such as along shaft 75 in some examples, to provide lubrication to the bearing 62. Each of the nozzle assemblies 66 may include one or multiple jets. More or fewer nozzle assemblies may be utilized in some examples. In some examples, as shown, the nozzle assemblies 66 are aft of the seal runner 72 and located axially between the seal runner 72 and the bearing 62. In some examples, oil could reach the seal runner 72 from oil sources in other manners, such as by spilling over from the shaft portion of bevel gear 65 to an inner diameter of the seal runner 72. In some examples, multiple oil sources may be utilized. In the example shown, the first axial face 82 is a forward face, and the second axial face 86 is an aft face; however, the first axial face 82 may be an aft face, and the second axial face 86 may be a forward face in other examples.

Figure 3:
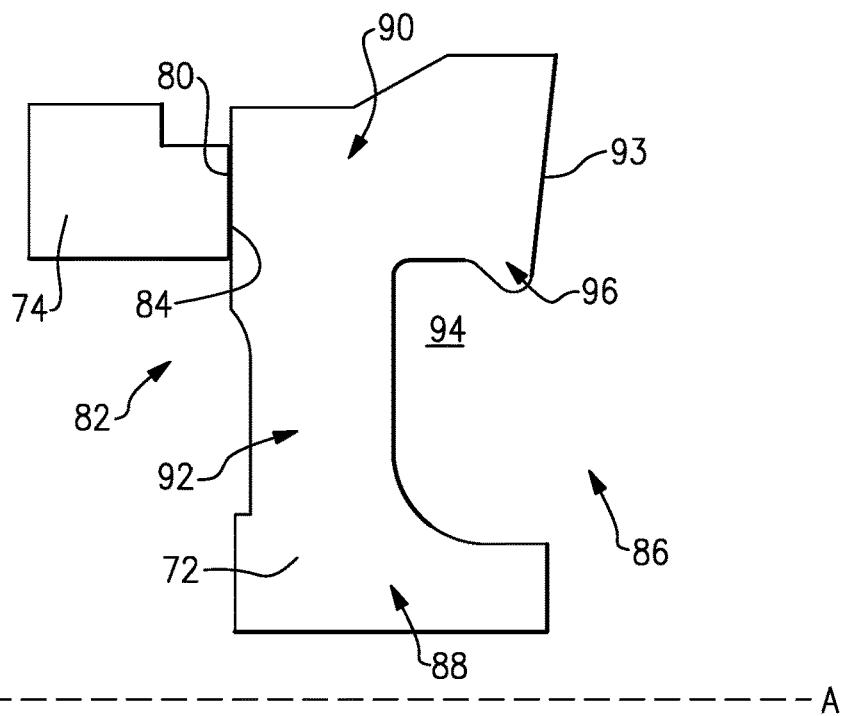
FIG. 3 illustrates a cross section of an example seal assembly of the bearing compartment in FIG. 2.

FIG. 3 illustrates the example seal runner 72 and seal 74. The seal runner 72 includes an annular body having a base portion 88, a radially outer portion 90, and a middle portion 92 connecting the base portion 88 and outer portion 90. The outer portion 90 at the axial face 82 provides the surface 80 that contacts the surface 84 of the seal 74. The example surface 80 extends radially and circumferentially and substantially perpendicular (90°±1°) to the axis A. Other portions of the seal runner 72, including the middle portion 92, may provide the surface 80 in some examples. The outer portion 90 at the axial face 86 provides a surface 93 axially opposite the surface 80.

A trough portion 94 is provided by the middle portion 92 and outer portion 90 and forms an annular channel at the axial face 86 of the seal runner 72. A dam 96 extends radially inward from the outer portion 90 and is provided between the trough portion 94 and the surface 93. In some examples, the trough portion 94 is radially inward of at least a portion of the surface 93. As discussed further below, oil may be directed into the trough portion 94, and the dam 96 retains some oil in the trough portion 94 and allows some oil to be spilled across the surface 93, which facilitates cooling of the seal runner 72. In some examples, the seal runner 72 is metallic. In some examples, the seal runner 72 is made of an alloy steel.

Figure 4:
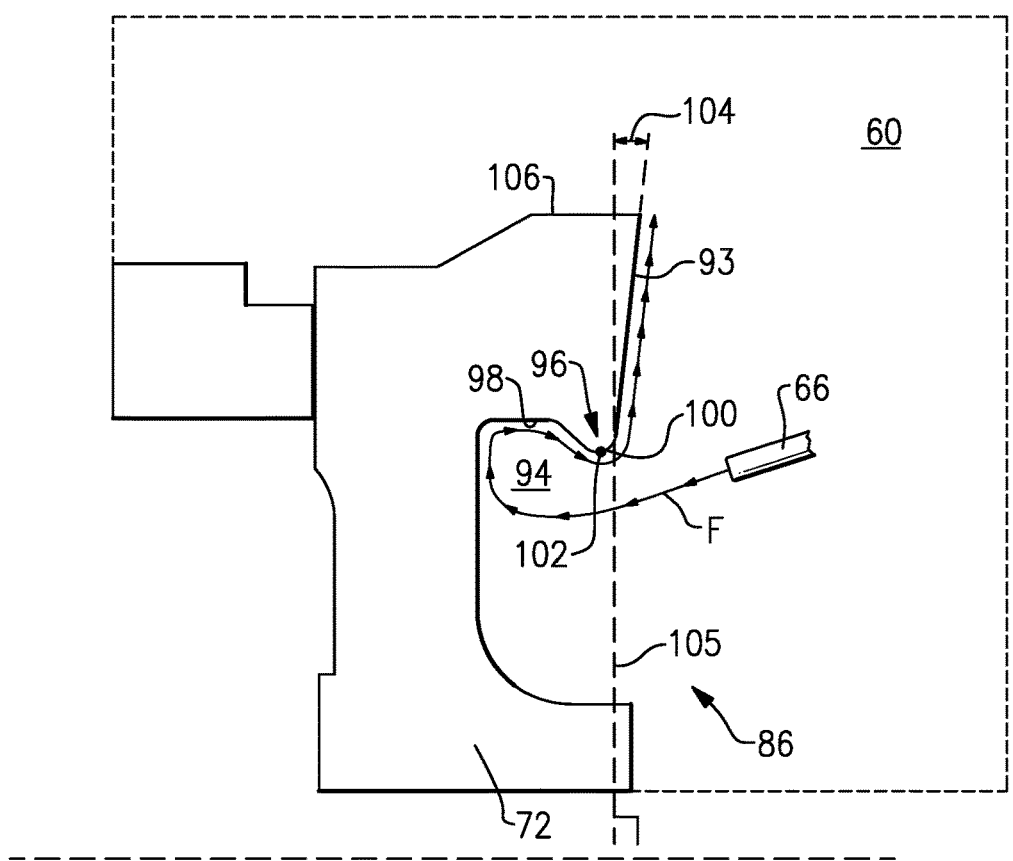
FIG. 4 schematically illustrates cooling of the example seal assembly of FIG. 3.

FIG. 4 schematically illustrates cooling of the seal runner 72. A nozzle assembly 66 is configured to direct oil into the trough portion 94. The example nozzle assembly 66 is positioned to spray oil directly into the trough portion 94, but other orientations may be utilized, such as the deflecting of oil off an intervening surface and into the trough portion 94, for example.

As shown schematically, the oil flows along the flowpath F. The centrifugal force of the seal runner 72 rotating about the axis A causes the oil directed into the trough portion 94 to move radially outward toward a radially outer surface 98 of the trough portion 94. The dam 96 is axially adjacent to the surface 98, and at least a portion of the dam 96 is radially inward of the surface 98, such that the dam 96 retains an amount of oil in the trough portion 94. In some examples, the dam 96 is provided by a convex curved surface 100 that connects the trough portion 94 to the surface 93. The surface 100 has a radially innermost point 102 that is radially inward of the surface 98. As shown schematically, the flow F of oil eventually spills over the dam 96 and runs as a thin film along the surface 93. In some examples, the oil spills over the dam 96 and runs along the surface 93 within 1 second or less of being introduced into the trough portion 94. In the examples where the dam 96 is provided by a convex curved surface 100, the surface 100 allows for a smooth flow across the dam 96 and to the surface 93.

In some examples, the surface 93 is angled by an angle 104 relative to a radial baseline plane 105 perpendicular to the axis of rotation A. In some examples, the angle 104 is between 0 and 45 degrees, such that a major directional component of the surface 93 is in the radial direction. In some examples, the angle 104 is between 1 and 5 degrees. The surface 93 may be angled to extend axially away from the trough portion 94 as it extends radially outward. The angled surface 93 ensures that a thin film of oil remains attached to the surface 93 when undergoing the centrifugal forces from the rotating seal runner 72, thus increasing contact between the surface 93 and the radially outwardly flowing oil. The surface 93 may extend radially outward to a radially outer surface 106 that extends from the first axial face 82 to the second axial face 86. In the example shown, the surface 106 is a free surface. In some examples, the surface 93 extends radially farther outward than the surface 80 to maximize the surface area of the surface 93.

As shown schematically, and with reference back to FIG. 2, the second axial face 86 and the surface 106 face the bearing compartment 60. The centrifugal forces of the rotating seal runner 72 allow the oil to flow radially outward across the surface 93, cooling the surface 93, the outer portion 90, and the seal runner 72 as a whole.

The examples disclosed allow for a controlled flow of cooling oil across an increased surface area of the seal runner 72 relative to prior art seal runners, which increases cooling. The increased surface area that contacts the cooling oil relative to prior art systems increases the overall heat transfer rate, which results in more efficient cooling, better overall cooling performance, and increased seal life. In some examples, the seal runner 72 design replaces the use of cooling holes for flowing oil therethrough, which may not be needed due to the improved cooling performance and may save manufacturing costs. The surface area of seal runner 72 in contact with the cooling oil is increased relative to the contacted surface area of seal runner designs with cooling holes, in which oil is flowed along the surface of each of multiple cooling holes.

It should be understood that relative positional terms such as "forward," "aft," "outer," "inner," "above," "below," and the like are with reference to the normal operational attitude of the vehicle and should not be considered otherwise limiting.

Although the different embodiments and examples have the specific components shown in the illustrations, embodiments of this disclosure are not limited to those particular combinations. It is possible to use some of the components or features from one of the embodiments and examples in combination with features or components from another one of the embodiments and examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
a shaft rotatable about an axis;
a bearing disposed about the shaft and within a bearing compartment;
a seal assembly positioned to seal the bearing compartment, the seal assembly comprising:
a fixed seal, and
a seal runner rotatable with the shaft and having a first axial face and a second axial face axially opposite the first axial face with respect to the axis, wherein the first axial face includes a first surface rotatable against the seal, and the second axial face includes a trough portion, a second surface angled relative to a radial baseline plane defined perpendicular to the axis, and a dam between the trough portion and the second surface, wherein the dam is formed by a convex surface including a radially innermost point that is radially inward of a radially outer surface of the trough portion; and
an oil source positioned to provide oil into the trough portion.

2. The gas turbine engine as recited in claim 1, wherein the fixed seal is a carbon face seal, and the seal runner is metallic.

3. The gas turbine engine as recited in claim 1, wherein the second surface is angled between 0 and 45 degrees from the radial baseline.

4. The gas turbine engine as recited in claim 3, wherein the second surface extends axially away from the trough portion as it extends radially outward.

5. The gas turbine engine as recited in claim 1, wherein the trough portion is radially inward of at least a portion of the angled surface.

6. The gas turbine engine as recited in claim 1, comprising a nozzle assembly disposed in the bearing compartment in communication with the oil source, wherein the nozzle assembly is positioned to direct oil into the trough portion.

7. The gas turbine engine as recited in claim 6, comprising a second nozzle assembly disposed in the bearing compartment, wherein the second nozzle assembly is positioned to direct oil toward the bearing.

8. The gas turbine engine as recited in claim 1, wherein the seal runner includes a base portion fixed to the shaft, and the trough portion, angled surface, and dam are radially outward of the base portion.

9. The gas turbine engine as recited in claim 1, wherein the seal runner includes a metallic annular body having a base portion, a radially outer portion, and a middle portion connecting the base portion and the radially outer portion, and the first surface and the second surface are provided by the radially outer portion.

10. A gas turbine engine comprising:
a low pressure compressor;
a high pressure compressor;
a combustor in fluid communication with the low pressure compressor and high pressure compressor;
a low pressure turbine that drives the low pressure compressor;
a high pressure turbine that drives the high pressure compressor through a shaft rotatable about an axis;
a fan driven by the low pressure turbine;
a bearing disposed about the shaft and within a bearing compartment between the high pressure compressor and the low pressure compressor, wherein the high pressure compressor includes an upstream-most stage of airfoils, and the bearing is disposed axially forward of the upstream-most stage relative to the flow of working fluid through the engine;
a seal assembly axially forward of the bearing and positioned to seal the bearing compartment, the seal assembly comprising:
a fixed seal, and
a seal runner rotatable with the shaft and having a first axial face and a second axial face axially opposite the first axial face with respect to the axis, wherein the first axial face includes a first surface rotatable against the seal, and the second axial face includes a trough portion, a second surface angled relative to a radial baseline plane defined perpendicular to the axis, and a dam between the trough portion and the second surface; and
an oil source positioned to provide oil into the trough portion.

11. The gas turbine engine as recited in claim 10, wherein the fixed seal is a face seal.

12. The gas turbine engine as recited in claim 10, wherein the seal is axially forward of the seal runner.

13. The gas turbine engine as recited in claim 12, wherein the bearing is a thrust bearing.

14. The gas turbine engine as recited in claim 13, wherein the fixed seal is a carbon face seal, and the seal runner is metallic.

15. The gas turbine engine as recited in claim 10, comprising a plurality of nozzle assemblies disposed axially between the seal assembly and the bearing.

16. A gas turbine engine comprising:
a low pressure compressor;
a high pressure compressor;

a combustor in fluid communication with the low pressure compressor and high pressure compressor;

a low pressure turbine that drives the low pressure compressor;

a high pressure turbine that drives the high pressure compressor through a shaft rotatable about an axis;

a fan driven by the low pressure turbine;

a bearing disposed about the shaft and within a bearing compartment between the high pressure compressor and the low pressure compressor, wherein the high pressure compressor includes an upstream-most stage of airfoils, and the bearing is disposed axially forward of the upstream-most stage relative to the flow of working fluid through the engine;

a seal assembly positioned to seal the bearing compartment, the seal assembly comprising:

a fixed seal, and a seal runner rotatable with the shaft and having a first axial face and a second axial face axially opposite the first axial face with respect to the axis, wherein the first axial face includes a first surface rotatable against the seal, and the second axial face includes a trough portion, a second surface angled relative to a radial baseline plane defined perpendicular to the axis, and a dam between the trough portion and the second surface, wherein the dam is formed by a convex surface, and the convex surface includes a radially innermost point that is radially inward of a radially outer surface of the trough portion; and an oil source positioned to provide oil into the trough portion.

17. The gas turbine engine as recited in claim 16, wherein the second surface is angled between 0 and 45 degrees from the radial baseline.

18. The gas turbine engine as recited in claim 17, wherein the fixed seal is a carbon face seal, and the seal runner is metallic.

* * * * *